United States Patent
Lyman et al.

(10) Patent No.: US 10,343,560 B2
(45) Date of Patent: Jul. 9, 2019

(54) COVER FOR CHILD CAR SEAT ATTACHMENT ANCHOR

(71) Applicant: Nissan North America, Inc., Franklin, TN (US)

(72) Inventors: Jason Lyman, Whitmore Lake, MI (US); Luis Eduardo Romero Hurtado, Toluca (MX); Brian Haupt, Farmington Hills, MI (US); Bobby Fuentes, Canton, MI (US); Lisle Bates, Southfield, MI (US); Niko Jovicevic, Ann Arbor, MI (US)

(73) Assignee: Nissan North America, Inc., Franklin, TN (US)

( * ) Notice: Subject to any disclaimer, the term of this patent is extended or adjusted under 35 U.S.C. 154(b) by 36 days.

(21) Appl. No.: 15/828,057

(22) Filed: Nov. 30, 2017

(65) Prior Publication Data
US 2019/0160981 A1    May 30, 2019

(51) Int. Cl.
*B60N 2/28* (2006.01)

(52) U.S. Cl.
CPC .......... *B60N 2/2887* (2013.01); *B60N 2/2821* (2013.01)

(58) Field of Classification Search
None
See application file for complete search history.

(56) References Cited

U.S. PATENT DOCUMENTS

| | | | |
|---|---|---|---|
| 5,918,934 A | 7/1999 | Siegrist | |
| 6,601,917 B1 * | 8/2003 | Christopherson | B60N 2/2821 24/633 |
| 2016/0325658 A1 * | 11/2016 | Hodgson | B60N 2/58 |
| 2018/0022245 A1 * | 1/2018 | Fujii | B60N 2/58 297/463.1 |

FOREIGN PATENT DOCUMENTS

| | | |
|---|---|---|
| DE | 102007060673 A1 | 7/2008 |
| DE | 102009036726 A1 | 2/2011 |
| DE | 102010032378 A1 | 2/2012 |
| JP | 2001206124 A | 7/2001 |
| JP | 2002104037 A | 4/2002 |
| JP | 2010064636 A | 3/2010 |
| JP | 2013060124 A | 4/2013 |
| KR | 101190018 B1 * | 10/2012 |
| WO | 2015122313 A1 | 8/2015 |

* cited by examiner

*Primary Examiner* — David E Allred
(74) *Attorney, Agent, or Firm* — Young Basile Hanlon & MacFarlane, P.C.

(57) ABSTRACT

An apparatus for covering a child car seat attachment anchor includes a sleeve that is formed in a single piece, a slot in a first face of the sleeve that defines an opening extending towards a second face of the sleeve opposing the first face, and a rib of the sleeve located at an end of the opening forming a retention surface for the child car seat attachment anchor. The sleeve has an outer shape forming a quadrilaterally faced hexahedron. The retention surface extends in parallel with the second face. The apparatus can be used to cover an ISOFIX wire that extends from a seat crevasse.

18 Claims, 4 Drawing Sheets

US 10,343,560 B2

COVER FOR CHILD CAR SEAT ATTACHMENT ANCHOR

TECHNICAL FIELD

This disclosure relates to child car seat attachment anchors.

BACKGROUND

A vehicle, such a passenger vehicle or commercial vehicle, typically includes several child car seat attachment anchors. In the industry, these are referred to commonly as ISOFIX wires. These types of attachment anchors are often integral with the vehicle body.

SUMMARY

Disclosed herein are implementations of features, elements, implementations, and embodiments of covers for a child car seat attachment anchor.

An aspect of the disclosed embodiments is an apparatus for covering a child car seat attachment anchor that includes a sleeve that is formed in a single piece, the sleeve having an outer shape forming a quadrilaterally faced hexahedron, a slot in a first face of the sleeve that defines an opening extending towards a second face of the sleeve opposing the first face, and a rib of the sleeve located at an end of the opening forming a retention surface for the child car seat attachment anchor, the retention surface extending in parallel with the second surface.

Another aspect of the disclosed embodiments is a vehicle that includes a car seat having a seat back, a seat cushion, and a seat crevasse where the seat back and the seat cushion meet, a child car seat attachment anchor extending from the seat crevasse, and the apparatus for covering the child car seat attachment anchor described above engaged with the child car seat attachment anchor.

Variations in these and other aspects, features, elements, implementations, and embodiments of the disclosure are described in further detail hereafter.

BRIEF DESCRIPTION OF THE DRAWINGS

The disclosure is best understood from the following detailed description when read in conjunction with the accompanying drawings. It is emphasized that, according to common practice, the various features of the drawings may not be to-scale. On the contrary, the dimensions of the various features may be arbitrarily expanded or reduced for clarity. Unless otherwise noted, like reference numbers refer to like features in the accompanying drawings.

DETAILED DESCRIPTION

Figure 1:
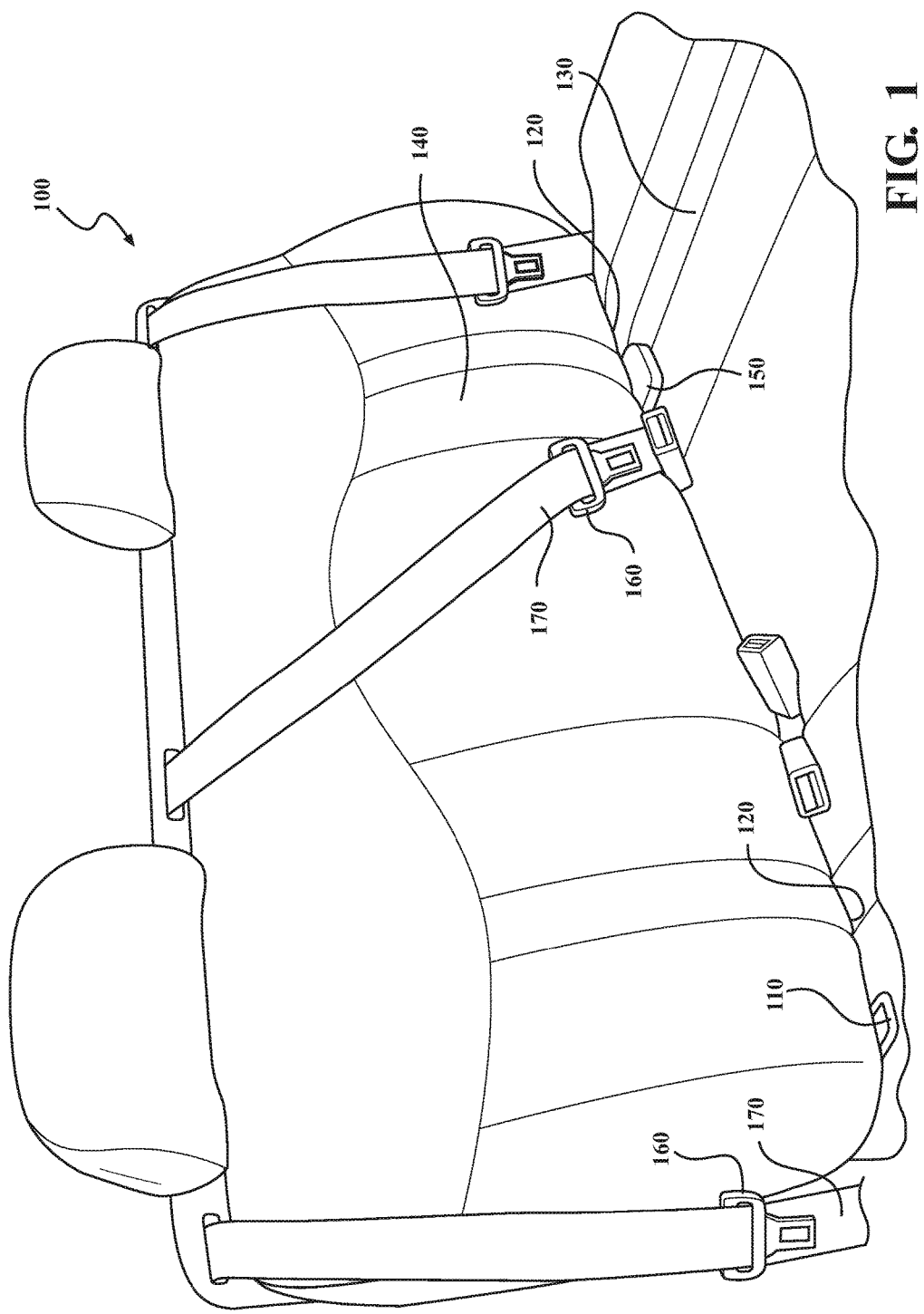
FIG. 1 is a diagram view representing a portion of a vehicle, including a car seat and a child car seat attachment anchor.

Child car seat attachment anchors are found in several locations within the interior of a vehicle, such as the vehicle 100 shown in FIG. 1. A child car seat attachment anchor may be referred to herein as an attachment anchor for simplicity.

As mentioned above, an attachment anchor may be integral with the vehicle body. Even when the attachment anchor is not integral with the vehicle body, it is fixedly secured to the vehicle body. In any event, it is commonly painted with the vehicle body. As a result, the color of the attachment anchor may not match colors within the cabin of the vehicle. For example, and referring to FIG. 1, the color of an attachment anchor 110 may be different from the interior upholstery.

This difference is color is not an issue if the attachment anchor is not visible within the cabin of the vehicle 100. However, easy use of the attachment anchor is desirable. Extending the body mounted legs of an ISOFIX wire to protrude further into the cabin is one way to make such an attachment anchor easier to use. This solution can create an appearance concern where, as in FIG. 1, an attachment anchor extends from a seat crevasse 120 where a seat cushion 130 and a seat back 140 of a car seat meet.

Some possible solutions to address this appearance concern include using a relatively large seat insert to house the attachment anchor, sew flaps into the seat to cover the attachment anchor, or form a multi-part (e.g., a two-part) insert that can frame or hide the attachment anchor. Each of these solutions has drawbacks. For example, inserts and flaps can sacrifice the high performance appearance of the vehicle. Multi-part inserts can be difficult to remove and, optionally, re-use.

The disclosure herein describes several implementations of an apparatus 150 for covering an attachment anchor that comprises a single piece. The single piece can be injection molded, for example, and can be molded in color and grain to match the aesthetics of a seat belt buckle 160 of a seat belt 170 of the vehicle 100. The implementations described herein provide a combination of cost effectiveness of manufacture and ease of use with a quality appearance.

Figure 2:
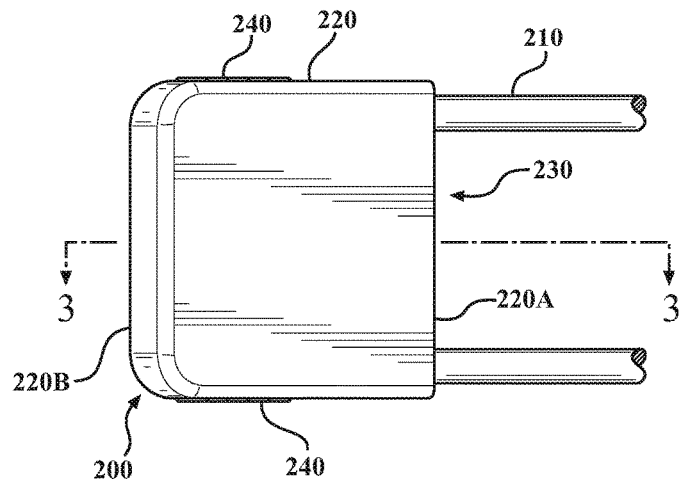
FIG. 2 is a plan view of an apparatus for covering a child car seat attachment anchor according to a first implementation.

FIG. 2 is a plan view of an apparatus 200 for covering a child car seat attachment anchor 210 according to a first implementation. In this example, the apparatus 200 includes a sleeve 220 that is formed in a single piece. The single piece can be formed from a plastic material that is colored to complement other interior components of the vehicle, such as a seat belt buckle as described above. The sleeve 220 can be injection molded to form the single piece using the material.

Figure 5:
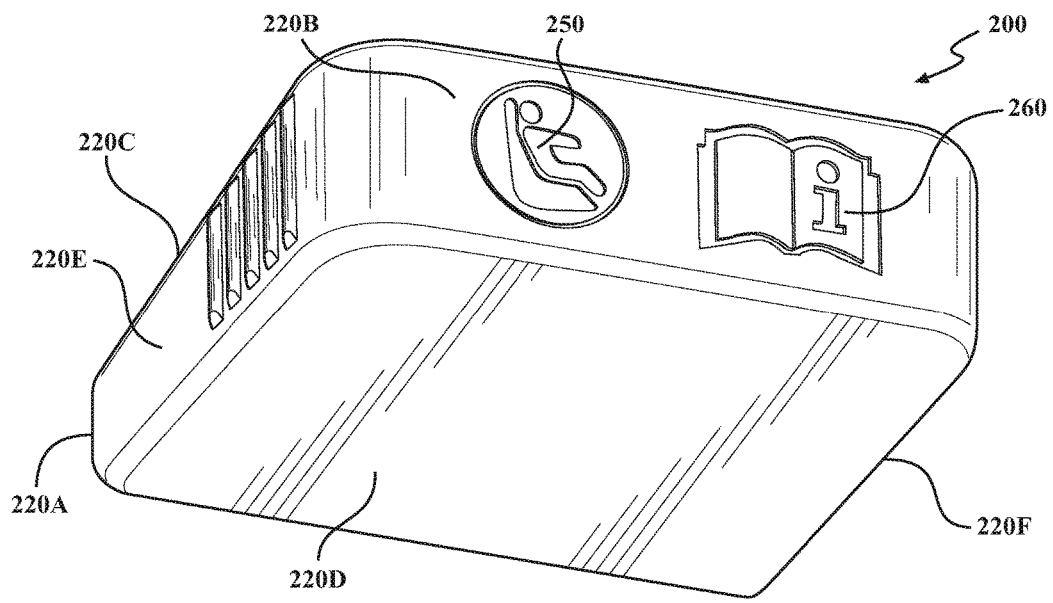
FIG. 5 is a front perspective view of the apparatus of FIG. 2.
Figure 6:
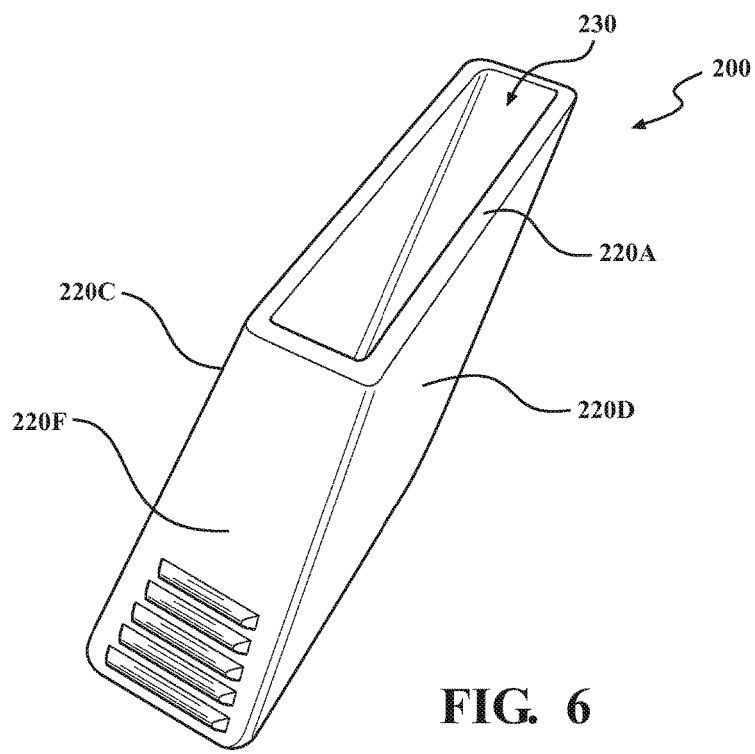
FIG. 6 is a rear perspective view of the apparatus of FIG. 2.

As can be seen in FIGS. 5 and 6, the outer shape of the sleeve 220 of the apparatus 200 can form a quadrilaterally faced hexahedron. In the example of FIGS. 5 and 6, the outer shape more specifically forms a truncated rectangular prism where the sleeve 220 comprises a top face 220C and a bottom face 220D opposing the top face 220C, and the top face 220C is closer to the bottom face 220D at the first face 220A than at the second face 220B. Further, the first face 220A and the second face 220B can be in parallel with each other. A third face 220E of the sleeve 220 and a fourth face 220F of the sleeve 220 opposing the third face 220E can be in in parallel with each other. The third face 220E and the fourth face 220F can thus be perpendicular to the first face 220A and the second face 220B. The top and bottom face of a sleeve are defined relative to the mounting orientation of the apparatus on the attachment anchor.

In some implementations, contact grips 240 are included on each of the third face 220E and the fourth face 220F. The contact grips 240 can be applied to the sleeve 220. More desirably, a contact grip 240 is a ridged surface portion included on each of the third face 220E of the sleeve 220 and the fourth face 220F of the sleeve 220 opposing the third face 220E. That is, the contract grips 240 may be formed integrally with the sleeve 220 as ridged surface portions. The contact grips 240, whether applied to the surface of the sleeve 220 or integral with the sleeve 220, may be located on the third face 220E and the fourth face 220F closer to the second face 220B than to the first face 220A. The ridged surface portions shown by example here comprise a plurality of molded surface lines extending between the top face 220C and the bottom face 220D of the sleeve 220. Other shapes and designs for the contract grips 240 are possible, or they may be omitted. The contact grips 240 can be used by a user to securely grip the apparatus 200 while removing or engaging the apparatus 200 with the attachment anchor 210.

A label may be molded in the second face 220B of the sleeve 220. For example, the label may be an ISOFIX logo 250 that aids the user in identifying the location of the attachment anchor. The label may be an owner's manual logo 260. More than one label may be included as shown in FIG. 5. While it is desirable that the label be molded integrally with the sleeve 220, this is not necessary. One or more labels can be applied to the outer surface of the sleeve 220, such as a label similar the ISOFIX label applied to the seat back in FIG. 1. Including one or more labels on the sleeve allows similar labels to be omitted from the seats of the vehicle, further improving the appearance of the cabin.

Still referring to FIGS. 2, 5, and 6, the attachment anchor 210 fits within a slot 230 in a first face 220A of the sleeve 220. The slot 230 defines an opening extending towards a second face 220B of the sleeve 220 opposing the first face 220A. In this first implementation, the slot 230 is rectangular. The interior of the apparatus 200 is best seen by FIGS. 3 and 4, where FIG. 3 is a cross-sectional view of the interior, taken along line 3'-3' of FIG. 2, and FIG. 4 is a close-up view of the retention surface of FIG. 3.

Figure 3:
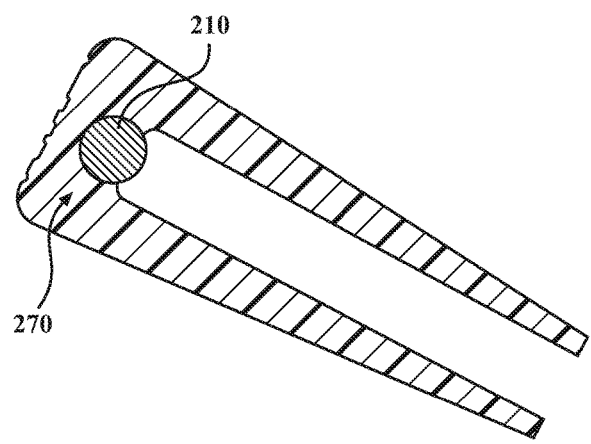
FIG. 3 is a cross-sectional view of an interior of the apparatus of FIG. 2, along line 3-3 of FIG. 2.
Figure 4:
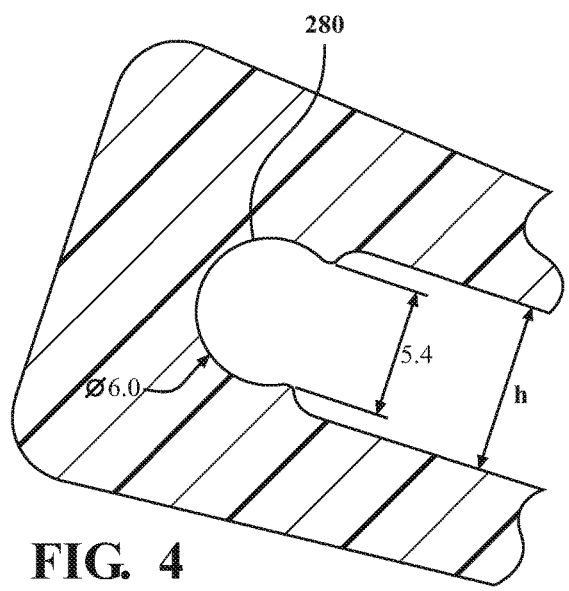
FIG. 4 is a close-up view of the retention surface of FIG. 3.

Referring to FIGS. 3 and 4, a rib 270 of the sleeve 220 is located at an end of the opening defined by the slot 230. The rib 270 forms a retention surface 280 for the child car seat attachment anchor 210. The retention surface 280 extends in parallel with the second face 220B. In this implementation, the retention surface 280 extends along only a portion of the interior between the third face 220E and the fourth face 220F. In other implementations, the retention surface 280 can extend along the length of the third face 220E and the fourth face 220F.

The retention surface 280 can have a semi-circular shape for a snap-fit engagement with the attachment anchor 210. The snap-fit can provide positive feedback to a user upon engagement with the attachment anchor 210. That is, ends of the semi-circular shape can adjoin the opening and generate positive feedback upon engagement with the attachment anchor 210.

In FIGS. 3 and 4, the semi-circular shape of the retention surface 280 has a diameter $\phi$ smaller than an interior height h of the opening between the top face 220C of the sleeve 220 and the bottom face 220D of the sleeve 220 opposing the top face 220C. For example, the size of the apparatus can be approximately 55×55×15 mm. As can be seen in FIG. 4, the diameter $\phi$ is 6 mm in this example. The ends of the semi-circular shape of the retention surface 280 that adjoin the opening are separated by a spacing of 5.4 mm. Each of these dimensions is smaller than the interior height h, which can be 6.5 mm or some other value.

The size of the apparatus depends on the size and shape of the attachment anchor. In some cases, the external length of the sleeve (in FIGS. 1-6 between the first face 220A and the second face 220B) is sufficient to prevent installation of a latch of a child car seat to the child car seat attachment anchor without removal of the apparatus from the child car seat attachment anchor. In this way, the external length is sufficient to engage with the attachment anchor and extend back into the seat crevasse, for example, such that the latch of a child car seat cannot engage with the attachment anchor without removing the apparatus.

Figure 7A:
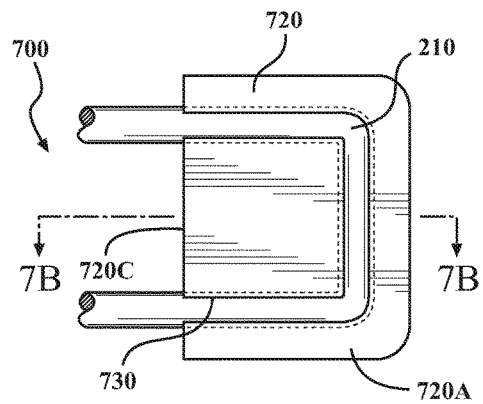
FIG. 7A is a bottom view of an apparatus for covering a child car seat attachment anchor according to a second implementation.
Figure 7B:
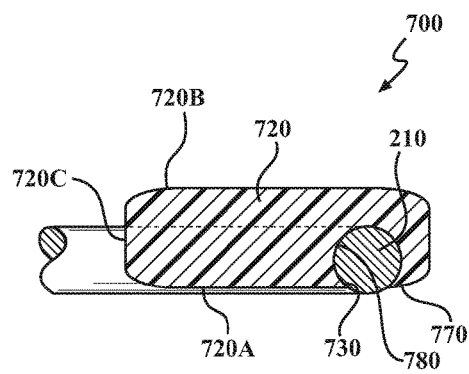
FIG. 7B is a cross-sectional view of an interior of the apparatus of FIG. 7A, along line 7B-7B of FIG. 7A.

In the implementation of FIGS. 1-6, the first face 220A is a rear face relative to the engagement position of the apparatus 200, and the second face 220B is a front face relative to the engagement position of the apparatus 200. FIGS. 7A and 7B show an implementation having a different orientation.

More specifically, FIG. 7A is a bottom view of an apparatus 700 for covering a child car seat attachment anchor according to a second implementation, and FIG. 7B is a cross-sectional view of an interior of the apparatus 700. Like the apparatus 200, the apparatus 700 includes a sleeve 720 formed as a single piece by, e.g., injection molding. The material can be plastic, or any other material suitable for the cabin of a vehicle. The sleeve 720 has an outer shape forming a quadrilaterally faced hexahedron. The apparatus 700 similarly includes a slot 730 in a first face 720A of the sleeve 720 that defines an opening extending towards a second face 720B of the sleeve 720 opposing the first face 720A. In this implementation, and in contrast to the first implementation, the first face 720A is a bottom surface of the sleeve 720, and the second face 720B is a top surface of the sleeve 720.

A rib 770 of the sleeve 720 is located at an end of the opening forming a retention surface 780 for the attachment anchor 210. The retention surface 780 extends in parallel with the second face 720B. In this implementation, the retention surface 780 conforms to the contours of the attachment anchor 210 and extends into the bottom surface of the sleeve 720 from a third face 720C in a U-shape. Thus, the apparatus 700 is mostly solid with two openings in the third face 720C. The third face 720C is the rear face relative to the engagement position of the apparatus 700 with the attachment anchor 210.

Like the first implementation, the retention surface 780 of the second implementation of FIGS. 7A and 7B can be a semi-circle for a snap-fit engagement with the attachment anchor 210. In use, the first implementation of the apparatus 200 engages by sliding the slot 230 of the sleeve 220 over the interior-facing edge of the attachment anchor 210 until the ends of the retention surface 280 snap fit around the attachment anchor 210. The second implementation of the apparatus 700 engages by sliding the slot 730 of the sleeve 720 over the top of the attachment anchor 210 until the ends of the retention surface 780 snap fit around the attachment anchor 210. In other respects, the second implementation can include the features and variations of the first implementation described above.

Figure 8:
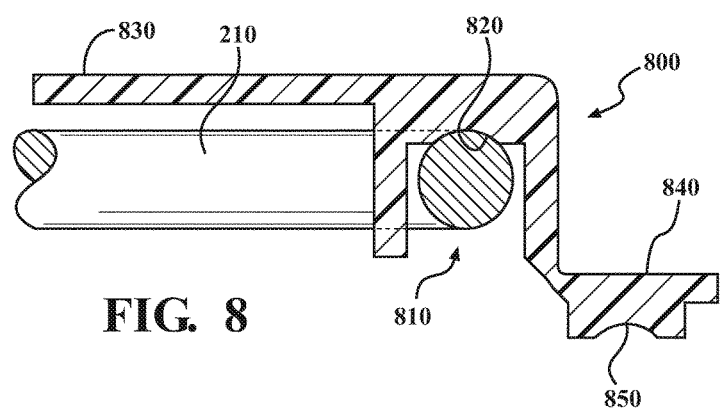
FIG. 8 is a side view of an apparatus for covering a child car seat attachment anchor according to a third implementation.

FIG. 8 is a cross-sectional side view of an apparatus 800 for covering a child car seat attachment anchor according to a third implementation. Like the first and second implementations, the apparatus 800 can be formed as a single piece by, e.g., injection molding. The apparatus 800 includes a sleeve in the form of a hinge 810 that snap fits, or clips, over a cross-member portion of a U-shaped attachment anchor, such as the attachment anchor 210, so that the attachment anchor is in contact with a retention surface 820 of the hinge 810.

Extending from the hinge 810 at the retention surface 820 is a first facing portion 830 that has a length long enough to cover the legs of the attachment anchor 210 visible within the cabin of the vehicle while making attachment of a child car seat latch difficult without removing the apparatus 800. The first facing portion 830 can have a surface area forming a square or other rectangular shape, depending upon the size of the attachment anchor 210. Extending from hinge 810 at a slot that defines an opening for the attachment anchor 210 is a second facing portion 840. The second facing portion 840 has, on its bottom surface, a concave contact grip 850. The concave contact grip 850 is sized for insertion of, e.g., a finger. The second facing portion 840 extends generally in parallel with the first facing portion 830.

To use the apparatus 800, a user grips the second facing portion 840 using the contact grip 850 and slides the first facing portion 830 along the top surface of the attachment anchor 210. When the slot of the hinge 810 is facing the cross-member portion of the attachment anchor 210, the user can push the second facing portion 840 down until the attachment anchor 210 snaps into engagement with the retention surface 820. The reverse operation, that is, pulling up and then pulling out the apparatus 800 using the concave contact grip 850 of the second facing portion 840, disengages the apparatus 800 from the attachment anchor 210.

The apparatus 800 as shown does not cover the outer edges of the legs of the attachment anchor 210. This simplifies the mold used to form the part and minimizes material. A variation in this implementation can include side portions extending generally perpendicularly from edges of the first facing portion 830 and about the outer edges of the legs of the attachment anchor 210.

Figure 9A:
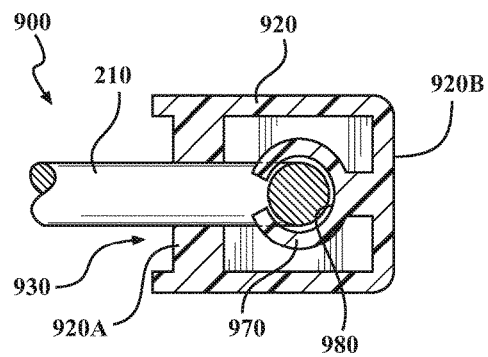
FIG. 9A is a cross-sectional view of an interior of an apparatus for covering a child car seat attachment anchor according to a third implementation.
Figure 9B:
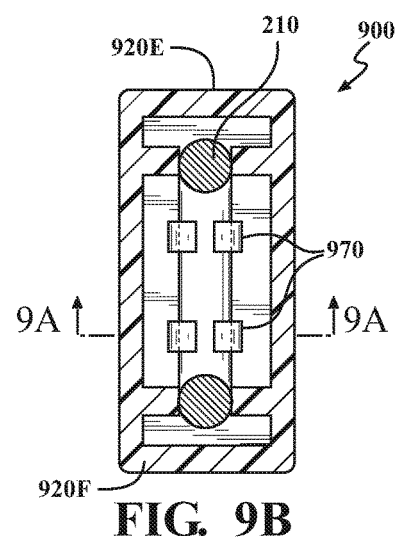
FIG. 9B is a rear view of the apparatus of FIG. 9A, showing a line 9A-9A indicating the cross-section of FIG. 9A.

FIG. 9A is a cross-sectional view of an interior of an apparatus 900 for covering an attachment anchor 210 according to a third implementation. FIG. 9B is a rear view of the apparatus 900, showing a line 9'-9' indicating the cross-section of FIG. 9A. In the implementation of FIGS. 1-6, the first face 220A is a rear face relative to the engagement position of the apparatus 200, and the second face 220B is a front face relative to the engagement position of the apparatus 200. FIGS. 9A and 9B show an implementation having the same orientation.

More specifically, and like the apparatus 200, the apparatus 900 includes a sleeve 920 that is formed as a single piece and can be injection molded. The material can be plastic, or any other material suitable for the cabin of a vehicle. The sleeve 920 has an outer shape forming a quadrilaterally faced hexahedron. The apparatus 900 similarly includes a slot 930 in a first face 920A of the sleeve 920 that defines an opening extending towards a second face 920B of the sleeve 920 opposing the first face 920A.

A rib 970 of the sleeve 920 is located at an end of the opening forming a retention surface 980 for the attachment anchor 210. The retention surface 980 extends in parallel with the second face 920B. By the retention surface 980 extending in parallel with the second face 920B, the retention surface 980 defines a support for the attachment anchor 210 to extend in parallel with the second face 920B (e.g., within the interior between a third face 920E and a fourth face 920F) as seen in FIG. 9B. Like the first implementation, the retention surface 980 of the fourth implementation of FIGS. 9A and 9B can have a semi-circular shape for a snap-fit engagement with the attachment anchor 210. Unlike the first implementation, however, the rib 970 comprises a plurality of clips spaced between the third face 920E of the sleeve 920 and a fourth face 920F of the sleeve 920 opposing the third face 920E. The third face 920E and the fourth face 920F are perpendicular to the first face 920A and the second face 920B.

In other respects, the fourth implementation can include the features and variations of the first implementation described above.

The design of a cover for a child car seat attachment anchor described herein eliminates the need for a multi-part injection mold, cutting material and tooling cost approximately in half. Further, the design can reduce false latching, while allowing the anchors, e.g., ISOFIX wires, to be easy to use. A cost effective solution that does not sacrifice the high performance appearance of the vehicle results.

As used herein, the terminology "or" is intended to mean an inclusive "or" rather than an exclusive "or" unless specified otherwise, or clear from context. In addition, the articles "a" and "an" as used in this application and the appended claims should generally be construed to mean "one or more" unless specified otherwise or clear from context to be directed to a singular form.

Although aspects, features, and elements are described herein in particular combinations, each aspect, feature, or element may be used independently or in various combinations with or without other aspects, features, and elements.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus for covering a child car seat attachment anchor, the apparatus comprising:
  a sleeve that is formed as a single piece, the sleeve having an outer shape forming a quadrilaterally faced hexahedron;
  a slot in a first face of the sleeve that defines an opening extending towards a second face of the sleeve opposing the first face; and
  a rib of the sleeve located at an end of the opening forming a retention surface for the child car seat attachment anchor, the rib extending in parallel with and proximate to the second face, wherein the quadrilateral faced hexahedron comprises a third face, a fourth face, a top face, and a bottom face surrounding said opening to form a tubular hollow closed at the end by the second face and opening out through the slot in the first face, and wherein the rib protrudes into the opening more than the top face, the bottom face, and a portion of the retention surface between the rib and the end.

2. The apparatus of claim 1, wherein the outer shape forms a truncated rectangular prism.

3. The apparatus of claim 2, wherein the sleeve comprises the top face and the bottom face opposing the top face, and the top face is closer to the bottom face at the first face than at the second face.

4. The apparatus of claim 1, further comprising:
a ridged surface portion on each of the third face of the sleeve and the fourth face of the sleeve opposing the third face.

5. The apparatus of claim 4, wherein the ridged surface portion on each of the third face and the fourth face is located closer to the second face than to the first face.

6. The apparatus of claim 4, wherein the ridged surface portion on each of the third face and the fourth face of the sleeve comprises a plurality of molded surface lines extending between the top surface and the bottom surface of the sleeve.

7. The apparatus of claim 1, further comprising:
a label molded in the second face of the sleeve.

8. The apparatus of claim 7, wherein the label comprises an ISOFIX logo.

9. The apparatus of claim 7, wherein the label comprises an owner's manual logo.

10. The apparatus of claim 1, wherein an external length of the sleeve is sufficient to prevent installation of a latch of a child car seat to the child car seat attachment anchor without removal of the apparatus from the child car seat attachment anchor.

11. The apparatus of claim 1, wherein the sleeve is injection molded.

12. The apparatus of claim 1, wherein the rib comprises a plurality of clips spaced between the third face of the sleeve and the fourth face of the sleeve opposing the third face, the third face and the fourth face perpendicular to the first face and the second face.

13. The apparatus of claim 1, wherein the retention surface has a semi-circular shape with a diameter smaller than an interior height of the opening between the top face of the sleeve and the bottom face of the sleeve opposing the top face.

14. The apparatus of claim 13, wherein ends of the semi-circular shape adjoin the opening and generate positive feedback upon engagement with the child car seat attachment anchor.

15. A vehicle, comprising:
a car seat having a seat back, a seat cushion, and a seat crevasse where the seat back and the seat cushion meet;
a child car seat attachment anchor extending from the seat crevasse; and
the apparatus of claim 1 engaged with the child car seat attachment anchor.

16. The vehicle of claim 15, wherein the child car seat attachment anchor comprises an ISOFIX wire.

17. The vehicle of claim 15, further comprising:
a seat belt; and
a seat belt buckle attached to the seat belt, wherein the sleeve is molded in color and grain to match the seat belt buckle.

18. The apparatus of claim 1, wherein the outer shape forms a truncated rectangular prism having the top face and the bottom face opposing the top face, the top face is closer to the bottom face at the first face than at the second face, the first face and the second face are in parallel with each other, and the third face of the sleeve and the fourth face of the sleeve opposing the third face are in parallel with each other and are perpendicular to the first face and the second face, the apparatus further comprising:
contact grips on each of the third face and the fourth face adjacent to the second face.

* * * * *